United States Patent [19]

Noguchi

[11] 4,315,287
[45] Feb. 9, 1982

[54] MAGNETIC TAPE TRANSPORT SYSTEM

[75] Inventor: Kunio Noguchi, Tokyo, Japan

[73] Assignee: Nippon Electric Company, Ltd., Japan

[21] Appl. No.: 46,189

[22] Filed: Jun. 6, 1979

[30] Foreign Application Priority Data

Jun. 19, 1978 [JP] Japan .................. 53/74415

[51] Int. Cl.³ .................. G11B 15/58; G11B 15/66
[52] U.S. Cl. .................. 360/95; 360/130.21; 242/182
[58] Field of Search .................. 360/95, 96.1, 90, 83, 360/130.2, 130.21; 242/182–185

[56] References Cited

U.S. PATENT DOCUMENTS

| 3,487,392 | 12/1969 | Lewis | 360/90 |
| 3,672,599 | 6/1972 | Torres | 242/184 |
| 3,974,981 | 8/1976 | Stiegler | 242/182 |
| 4,019,694 | 4/1977 | Fare et al. | 242/182 |
| 4,065,074 | 12/1977 | Anderson et al. | 242/184 |
| 4,093,148 | 6/1978 | Urynowicz et al. | 242/182 |
| 4,176,382 | 11/1979 | Froehlich et al. | 360/95 |
| 4,183,068 | 1/1980 | Barton, Jr. | 360/90 |

FOREIGN PATENT DOCUMENTS

| 2365236 | 7/1974 | Fed. Rep. of Germany | 242/182 |
| 2246015 | 4/1975 | France | 360/90 |

Primary Examiner—John H. Wolff
Attorney, Agent, or Firm—Charles W. Helzer

[57] ABSTRACT

In magnetic tape transport system of the type comprising a tape supply reel, a tape take up reel and vacuum columns located on the supply and take up for applying a tension to a magnetic tape, there are provided tape mounting members for removably supporting the take up reel and the supply reel, upright supply and take up vacuum column having openings opened downwardly, said supply and take up vacuum columns being disposed on the right side of and adjacent to the supply and take up reel mounting means their openings directed downwardly, and a capstan and a magnetic head assembly, said supply and take up vacuum columns, said capstan and said magnetic head assembly being disposed on a tape running path from said supply vacuum column to said take up vacuum column. There is also provided an automatic tape threading means between the magnetic head assembly and the take up reel on the tape path.

8 Claims, 3 Drawing Figures

MAGNETIC TAPE TRANSPORT SYSTEM

BACKGROUND OF THE INVENTION

This invention relates to a magnetic tape transport system, more particularly a vacuum column type magnetic tape transport system utilizing a vacuum column as tape buffer means.

With recent advance of computer systems it becomes desirable to miniaturize various component parts so that an effort has been made to also miniaturize the magnetic tape transport system, which is a peripheral equipment of the computer system.

FIG. 1 shows one example of the magnetic tape transport system which has been developed to satisfy such requirement. This transport system is disclosed, for example in Japanese laid open Utility Model specification No. 137,510 of 1974.

The magnetic tape transport 10 shown in FIG. 1 comprises a supply or file reel 11, a take up or fixed reel 12 which are disposed in the vertical direction, a first vacuum column 13 disposed to the right of the reels with its upper end opened, and a second vacuum column 14 with its lower end opened. First and second auxiliary vacuum columns 15 and 16 are disposed near the openings of the first and second vacuum columns 13 and 14. The vacuum column 14 adjacent the reels 11 and 12 is provided with sliding guide members $17_1 \sim 17_6$, a magnetic head assembly 18, a capstan 19, and tape guides 20 and 21 which are arranged to form a path for the magnetic tape. There are also provided guide rollers 23, 24, 25 and 26, usually in the form of air bearings.

When automatically threading a magnetic tape 28 from the supply reel 11 to the take up reel 12, the magnetic tape payed out from the supply reel 11 passes between guide members $17_1$ and $17_2$, between guide member $17_3$ an tape guide 20 in front of the magnetic head assembly 18, and between guide member $17_5$ and tape guide 21, and then taken up by the take up reel 12. Thereafter, the vacuum column 13 is actuated to pull the magnetic tape toward the vacuum column 13 from between rollers 23 and 24 as shown in FIG. 1. The vacuum column 14 is also actuated to bring the magnetic tape to the state shown in FIG. 1.

With this construction, however, since the distance between the tape and the opening of the vacuum column 13 is large, it is not easy to pull the magnetic tape 28 toward the vacuum column 13. Moreover, as the distance between the vacuum column 13 and the capstan 19 is large and since guide rollers 24 and 25 are provided therebetween, the moment of inertia during operation, starting and stopping, the tension between a source of tension and a source of drive varies greatly, especially at the time of repeating start and stop and forward and reverse runnings in a short period. This causes poor contact of the magnetic tape 28 against the magnetic head thus rendering impossible satisfactory reading and writing. Moreover, since the direction of running of the magnetic tape 28 is changed twice by guide rollers 24 and 25, the decrease in the tension force applied to the magnetic tape 28 at these points can not be neglected.

SUMMARY OF THE INVENTION

Accordingly, it is an object of this invention to provide an improved magnetic tape transport that can ensure stable contact between a magnetic tape and a magnetic head assembly.

Another object of this invention is to provide an improved magnetic tape transport provided with an automatic threading mechanism of simple construction.

A further object of this invention is to provide an improved tape transport wherein the length of the magnetic tape between a capstan and a vacuum column acting as a tension source is decreased to decrease the moment of inertia of the magnetic tape, and the number of changes in the direction of running of the magnetic tape is decreased, thus decreasing the number of component parts which are necessary to cause the magnetic tape to run reliably along a predetermined path.

According to this invention, there is provided a magnetic tape transport of the type comprising a pair of reel mounting means for removably mounting thereto a tape supply reel and a tape take up reel, respectively, said supply reel mounting means being disposed above said take up reel mounting means, upright supply and take up vacuum columns having openings facing downwardly, said supply vacuum column being disposed on the right side of and adjacent to said supply reel mounting means and said take up vacuum column disposed on the right side of and adjacent to said supply vacuum column, a capstan and a magnetic head assembly, said supply and take up vacuum columns, said capstan and said magnetic head assembly being disposed on a take up running path from said supply vacuum column to said take up vacuum column.

DESCRIPTION OF THE PREFERRED EMBODIMENTS

Figure 1:
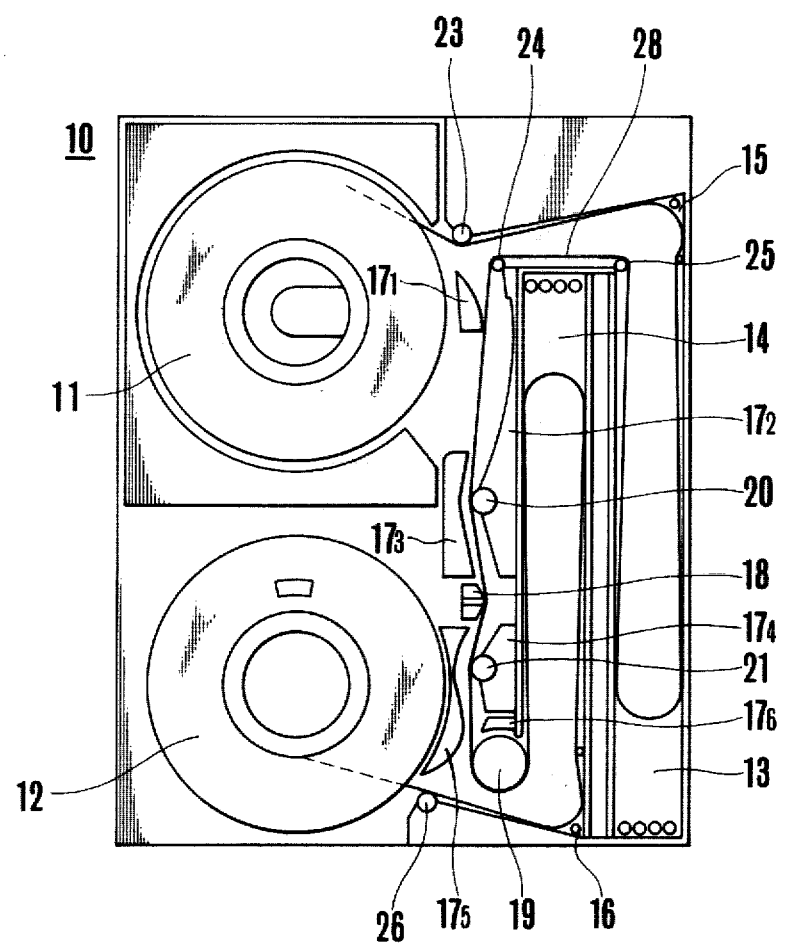
FIG. 1 is a schematic plan view of one example of a prior art magnetic tape transport system.

The invention will now be described with reference to the accompanying drawings. A preferred embodiment of this invention shown in FIG. 2 comprises reel mounting mechanisms 30A and 30B which support a supply reel 32 in the upper portion and a take up reel 32 in the lower portion. A supply vacuum column 34 and a take up vacuum column 35 are juxtaposed to the right of the reel mounting mechanisms with their openings directed downwardly. A magnetic head assembly 36 and a capstan 37 are disposed on a tape running path between the openings of the vacuum columns 34 and 35. A set of magnetic tape guide members 40 and 47 are located between the supply reel 31 and take up reel 32 on opposite sides of the magnetic head assembly 36 and automatic threading guide members 41 and 42 are disposed between the magnetic head assembly 36 and the take up reel 32.

The supply reel 31 and the take up reel 32 may be removably mounted on the reel mounting mechanisms 30A and 30B respectively. However, it is assumed now that the take up reel 32 is fixed to the reel mounting mechanism 30B and positioned beneath the reel mounting mechanism 30A. The axis of the reel mounting mechanism 30B for driving the take up reel 32 is slightly offset to the right with respect to the axis of the reel mounting mechanism 30A for driving the supply reel 31. Although not shown in the drawing, the mounting mechanism 30B is provided with a well known vacuum suction port about the periphery of the shaft of the take up reel to wrap the leading end of the magnetic tape.

The supply vacuum column 34 is disposed in the vertical direction to the right of the supply reel 31 and has an opening 34a opened downwardly and a vacuum suction port 34b in the upper portion of the column 34. The take up vacuum column 35 is located to the right of the supply vacuum column 34 at a position lower than it. The take up vacuum column 35 is provided with an opening 35a directed downwardly and a vacuum suction port 35b in the upper portion of the column 35. For this reason, it is possible to make the length of the column 35 to be considerably longer.

The take up vacuum column 35 is provided with an auxiliary vacuum column 43 near its opening 35a. This auxiliary vacuum column 43 is used for the purpose of changing the direction of running of a magnetic tape 44.

The capstan 37 is disposed at the open end of the take up vacuum column 35, and the magnetic head assembly 36 is disposed between the capstan 37 and the open end of the supply vacuum column 34. Adjacent the magnetic head assembly 36 are juxtaposed a magnetic tape cleaner 45 and a BOT/EOT/NO-TAPE detector or sensor 46, where BOT means the beginning of the tape and EOT the end of the tape.

The magnetic tape cleaner 45 is constituted by a knife edge or the like and used to clean the magnetic tape. The purpose of the BOT/EOT/NO-TAPE detector 46 is to detect a BOT marker and a EOT marker and to detect the presense or absence of the tape on the running path. The tape guides 40 and 47 are disposed on the opposite sides of the array of the BOT/EOT/NO-TAPE detector 46, the magnetic head assembly 36 and the magnetic tape cleaner 45 so that the magnetic tape passes by the magnetic head always along a definite path. A magnetic tape threading guide member 49 is positioned between the supply reel 31 and the magnetic head assembly 36 to positively guide to the magnetic head assembly 36 the leading end of the magnetic tape which falls down when the tape is firstly payed out from the supply reel 31 for the purpose of taking up the tape by the take up reel. The threading mechanism comprises the threading guide member 41 for ejecting air along the threading path of the magnetic tape and the second air ejecting threading guide member 42 which urges the magnetic tape toward the guide member 41. The threading guide member 41 is disposed between the magnetic head assembly 36 and the take up reel 32. More particularly threading guide member 41 has a opening 41b which ejects air in the tangential direction with respect to the threading path 41a to urge the magnetic tape 44 along the threading path 41a. The air ejecting guide member 42 is positioned to oppose threading guide member 41 and has an air ejecting port 42a to eject air in a direction substantially perpendicular to the magnetic tape path so as to guide the same along the running path 41a.

A guide roller 51 and a NEAR END detector 52 are provided between the vacuum column 35 and the take up reel 32. The NEAR END detector 52 detects a BOT marker on the magnetic tape and provides a BOT signal for indicating that the leading end of the magnetic tape is at a nearby position when taking up the magnetic tape from the supply reel at a high speed.

Figure 2:
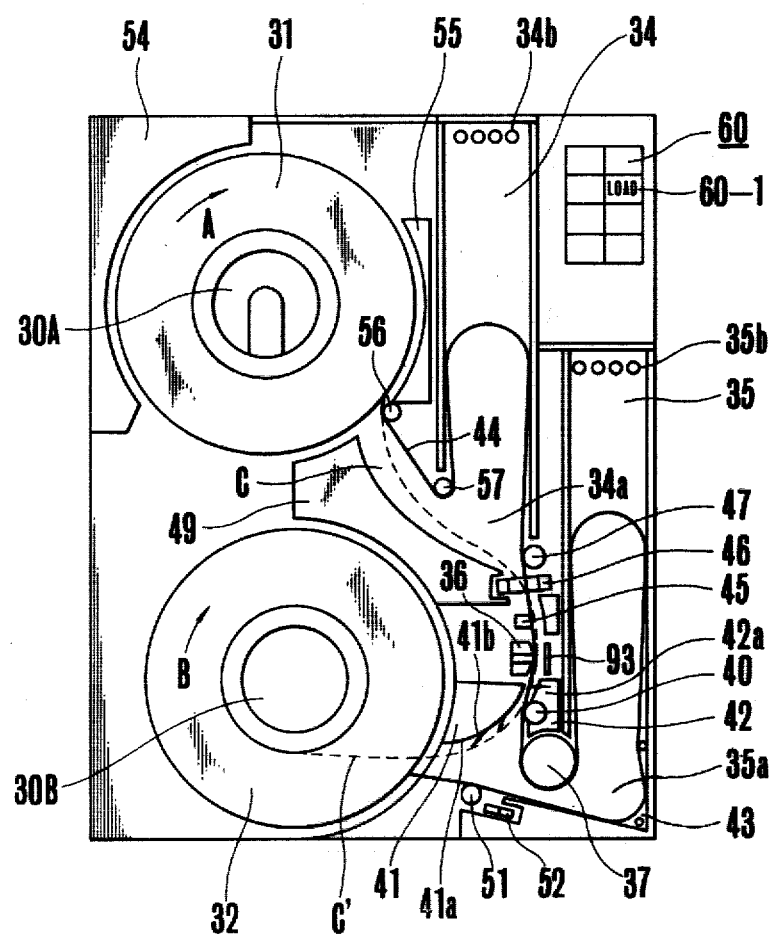
FIG. 2 is a schematic plan view of a magnetic tape transport system embodying the invention and FIG. 3 is a block diagram showing an electric circuit utilized in the embodiment shown in FIG. 2.

A cartridge guide 54 and a threading chute 55 are provided on the side of the reel mounting mechanism 30A for the supply reel 31, and guide rollers 56 and 57 are disposed between the supply reel 31 and the vacuum column 34. An operating panel 60 is mounted at the upper right side of the magnetic tape transport and includes a load button and other various buttons. Since these buttons are well known in the art and immaterial to the present invention, they are not shown. In FIG. 2, reference numeral 93 designates a shield block.

Figure 3:
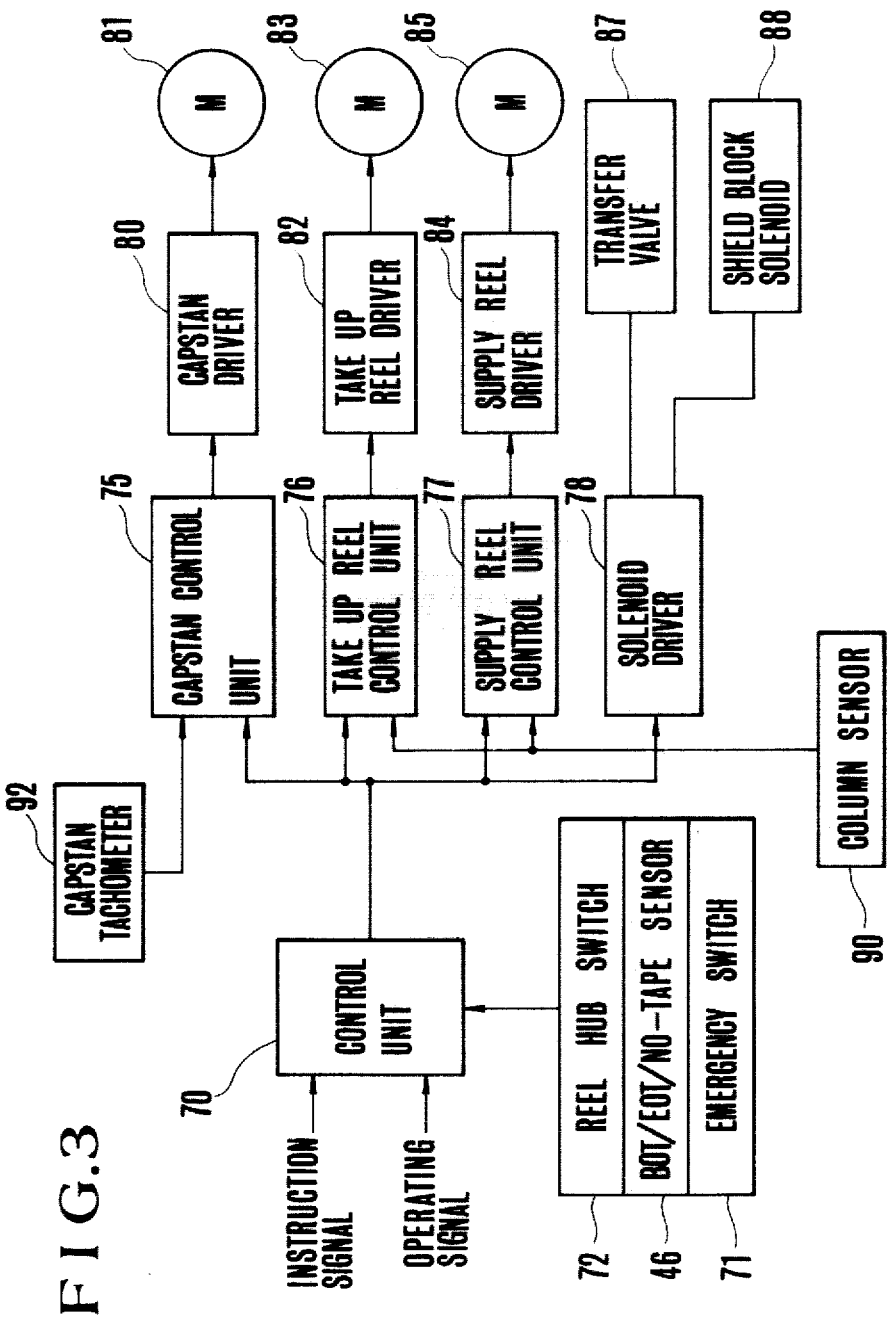

FIG. 3 is a block diagram showing a control device for controlling various elements of the magnetic tape transport described above. In FIG. 3, a control unit 70 is connected to receive an instruction signal from elements on the upstream side and operating signals from various switches of the operating panel 60 shown in FIG. 2 and to receive output signals from various switches of the apparatus (an emergency switch 71, a reel hub switch 72), BOT/EOT/NO-TAPE sensor 46, etc., so as to control various control units (for example 75, 76 and 77) and a solenoid driver 78 based on these input signals.

A capstan control unit 75 controls a driving motor 81 of the capstan 37 via capstan driver 80 whereas a take up reel control unit 76 controls a driving motor 83 of the take up reel 32 via a take up reel driver 82.

Further, a supply reel control unit 77 controls a driving motor 85 of the supply reel 31 via supply reel driver 84.

The solenoid driver 78 is provided for the purpose of driving a transfer valve 87 for supplying vacuum and pressurized air to various elements, and a shield block solenoid 88 which operates the shield block 93 shown in FIG. 2, is provided so as to urge the magnetic tape againt the magnetic head assembly 36.

Column sensors 90 are provided for each of the take up vacuum column 35 and the supply vacuum column 34 for detecting the loop position of the magnetic tape within columns 34 and 35 and the outputs of the column sensors 90 are supplied to the take up reel control unit 70 and the supply reel control unit 77. The capstan 37 is provided with a capstan tachometer 92 and its output signal is applied to the capstan control unit 75 to act as a feedback signal.

The operation of this invention will be described with reference to FIGS. 2 and 3.

At first, the supply reel 31 is mounted on the reel mounting mechanism 30A and the supply reel 31 is rotated to bring the leading end of the magnetic tape to one side of the threading chute. Then the load button 60-1 on the operating panel 60 is depressed to apply a load signal to the control unit 70. In response to this load signal the control unit 70 applies an instruction signal to the take up reel control unit 70, the supply reel control unit 77 and the solenoid driver 78. In response to this instruction signal, the supply reel control unit 77 rotates in the foreward directions (shown by arrow A) the supply reel motor 85 via the reel driver 84. In the same manner, the take up reel control unit 76 rotates in the forward direction (shown by arrow B) the take up reel motor 83 via the take up reel driver 82. The vacuum/pressure transfer valve 87 and the shield block solenoid coil 88 are excited by the solenoid driver 78 to supply pressurized air to the automatic threading member including the guide member 41 and air ejector 42, and to apply vacuum to the take up reel suction port. Further, the shield block 93 opposing the magnetic head assembly 36 is opened to pass the leading end of the magnetic tape.

Under these conditions, when the supply reel 31 is rotated in the direction of arrow A, owing to its weight, the leading end of the magnetic tape falls down from a position C, shown by dotted lines, to a position beneath the magnetic head assembly after passing between the magnetic head assembly 36 and the shield block 93. Thereafter, the leading end of the magnetic tape is guided to a position C' shown by dotted lines by the air ejected from the automatic threading member so that the leading end of the magnetic tape is sucked by vacuum applied to the vacuum suction port surrounding the shaft of the take up reel 32 and wrapped about the take up reel 32.

When the magnetic tape wraps about the take up reel, the reel hub switch 72 (shown in FIG. 1) operates to generate a reel hub switch signal. In response to this signal the control unit 70 drives the magnetic tape in the forward direction for a definite time. When a plurality of turns of the magnetic tape are formed on the take up reel 32, both reel drive motors 83 and 85 are stopped and the vacuum/pressure transfer valve 87 is switched to deenergize the solenoid driver 78.

Application of vacuum is switched from the take up reel to the vacuum columns so that a vacuum suction force is applied to vacuum suction port 34b, 35b and 43 to operate respective vacuum columns. On the other hand, supply of the pressurized air is switched from the automatic threading member to exhaust. At this time, the solenoid driver 78 de-energizes the shield block solenoid coil 88 to move the shield block 93 toward the magnetic head assembly in cooperation with a spring bias means (not shown).

Thereafter, the take up control unit 76 is supplied with a reverse instruction signal to reverse the direction of running of the magnetic tape, whereas the supply reel control unit 77 is supplied with a forward instruction signal so that the magnetic tape is payed out from both reels thus forming loops in the vacuum volumns. When the loops of the tape enter into a reel servo-region, the emergency switch 71 operates. Concurrently with the operation of the reel servo-mechanism in response to the output signal of the column sensor 90 which acts as a feedback signal, a forward instruction signal is applied to the capstan control unit 75 thereby driving the capstan motor 81 at a constant speed by utilizing the output of the capstan tachometer 92 as a feedback signal.

The magnetic tape 44 continues its forward running until its BOT mark is detected by the BOT/EOT/NO-TAPE detector 46 and when the tape is loaded in the vacuum columns, a running state shown by solid lines would be formed.

During the operation described above where a signal from the BOT/EOT/NO-TAPE signal is not applied to the control unit 70 in a definite interval after a rotation instruction signal has been applied to the control unit 70, or even in a case where a signal is applied from the BOT/EOT/NO-TAPE detector 46 but a signal is not applied from the reel hub switch 72 in a definite interval subsequent to the application of the signal from the BOT/EOT/NO-TAPE detector 46 it is judged that the automatic threading has failed. Under these conditions, the control unit 70 supplies a reverse instruction signal to the supply reel control unit 77 and the take up reel control unit 76 thus taking up all portions of the magnetic tape payed out from the supply reel about the supply reel.

When the BOT marker is detected the magnetic tape transport is in the operable state, so that thereafter the tape can be accelerated smoothly at the time of starting and stopping.

The embodiment described above has the following advantages. During threading, the magnetic tape 44 is wrapped about the capstan 32 at an angle of about 180° and the tape is divided into a first portion which immediately enters in the take up vacuum column 35 and a second portion which linearly enters into the supply vacuum column 34 after contacting tape guide member 40, magnetic head assembly 36, tape cleaner 45 and tape guide member 47. The portion of the magnetic tape which enters directly into vacuum column 35 from the capstan 37 is not subjected to any friction and its moment of inertia is caused only by the mass of the portion of the magnetic tape in the vacuum column so that the acceleration of the tape at the time of starting and stopping is influenced by only the mass of the magnetic tape.

Moreover, as it is possible to decrease the distance between the capstan 37 and the opening of the vacuum column 34, the mass of the magnetic tape portion which runs from the capstan 37 into the supply vacuum column 34 via the magnetic head and the tape guide members can be made small thus decreasing the moment of inertia. Moreover, since it is possible to decrease the wrapping angles of the tape about the guide members 47 and 40, the friction to the tape is small. Consequently, it is possible to apply a large tension to the portion of the magnetic tape on the magnetic head without greatly increasing the tension of the magnetic tape applied by the vacuum column 34. As above described during the acceleration of the magnetic tape, at the time of acceleration and stopping the tension is not decreased by the tape guide members 47 and 40 whereby it is possible to run the tape at a high speed while maintaining a good contact to the magnetic head. For this reason, it is possible to run the magnetic tape at a high speed without using any air bearing as in the prior art transport.

Furthermore, it is possible to decrease the length of the automatic threading path (shown by dotted lines C and C' in FIG. 2) in comparison the prior art transport and, since magnetic tape falls down owing to its weight from the supply reel 31 to the magnetic head assembly 36, only one air ejector is sufficient thereby simplifying the construction.

According to the magnetic tape transport system it is possible to increase the length of the vacuum columns on the supply and take up side in accordance with the speed of the magnetic tape.

As above described, according to this invention, the supply and the take up vacuum columns are arranged as shown in FIG. 2 to smoothly contact the magnetic tape against the magnetic head assembly. Moreover, the automatic threading mechanism is simple and inexpensive.

What is claimed is:

1. A magnetic tape transport system of the vacuum column tape comprising: a housing having a base member; a pair of reel mounting means disposed one over the other and closely adjacent to each other for removably mounting an upper tape supply reel and a lower tape take up reel; guide means for guiding a tape from said upper supply reel to said lower take up reel along a predetermined essentially straight line tape path that extends downwardly towards the base member and take up reel; a supply vacuum column disposed adjacent to said supply reel and having an open end for receiving tape delivered from said supply reel while said transport system is running located along the predetermined tape path; a take up vacuum column juxtaposed to and extending substantially parallel with said supply vacuum column, said take up vacuum column having an open end for receiving said tape while said tape transport system is running positioned at a location further along the path of movement of said tape from the open end of said supply vacuum column; said supply and take up vacuum columns having the open ends thereof extending downwardly toward the base member in the same direction and disposed substantially along the predetermined tape path of movement at spaced-apart locations; a magnetic head assembly positioned along the tape path of movement between the spaced-apart locations of the open ends of the supply and take up vacuum columns and disposed substantially on a line that extends in common with a wall of said supply vacuum column and a juxtaposed wall of the adjacent take up column, said magnetic head assembly opposing said tape and serving as part of the guide means for tape delivered from said supply vacuum column; an upper tape threading guide member located on the tape path between said supply reel and said magnetic head for guiding the tape during threading past the magnetic head assembly; lower automatic tape threading means located on the tape path between said magnetic head and said take up reel of providing automatic take up of said magnetic tape on said take up reel during threading, said lower automatic tape threading means comprising tangential air ejecting means for ejecting air in a direction tangential to the direction of said magnetic tape path during threading for moving the tape in the direction of the take up spool, and transverse air ejecting means disposed on the opposite side of said magnetic tape with respect to said tangential air ejecting means for ejecting air transversely against said magnetic tape to cause it to bend toward said take up reel during threading so as to be automatically wound therearound; and a capstan disposed substantially on said line and immediately adjacent the open end of said take up vacuum column, for driving said tape after threading, said capstan being located at a position on the tape path of movement below said magnetic head assembly and where the tape is reversed back into the open end of said take up vacuum column during operation prior to passing to the take up reel.

2. A magnetic tape transport system according to claim 1 wherein the reel mounting means are secured within the housing with the tape supply reel vertically disposed over the tape take up reel and the base member and with the predetermined tape path extending downwardly from the supply reel to the take up reel in a substantially straight line path having a minimum number of directional changes of tape movement from a tangential take-off from the supply reel to a tangential take-up on the take up reel, with the exception of the tape path portions extending into the supply and take-up vacuum columns during operation after threading, whereby the effects of gravitational force, air jet forces and vacuum effects on the tape and on the supply reel and take up reel drives all harmonize to facilitate automatic threading of a tape on the magnetic tape transport system with minimum difficulty.

3. The magnetic tape transport system according to claim 1 or 2 wherein said take up reel mounting means includes a first shaft for driving said take up reel and a second shaft for driving said supply reel, said first shaft being slightly offset away from said supply vacuum column with respect to said second shaft.

4. The magnetic tape transport system according to claim 1 or 2 wherein said supply vacuum column and said take up vacuum column are disposed on opposite sides of said line that extends in common with a wall of said supply vacuum column and a wall of said take up vacuum column.

5. The magnetic tape transport system according to claim 1 or 2 further comprising an auxiliary vacuum source serving as a sub-buffer located near the open end of said take up vacuum column.

6. The magnetic tape transport system according to claim 1 further including tape sensing means for sensing the fact that the tape is threaded on the take-up reel and automatic control means responsive to said tape sensing means for automatically turning off said tangential and transverse air ejecting means required during threading of the tape and turning on the supply and take-up vacuum columns during running of the tape transport system.

7. The magnetic tape transport system according to either of claim 1, 2 or 6 wherein the take-up reel mounting means includes vacuum suction ports that are automatically activated during tape threading concurrently with the tangential and transverse air ejecting means.

8. The magnetic tape transport system according to claim 1 or 2 wherein the length of said supply and take up vacuum columns is greater than the diameter of said supply and take up reels and the take up vacuum column extends beyond the open end of the supply vacuum column along the said commonly extending line.

* * * * *